US012642198B2

(12) United States Patent
Holmes et al.

(10) Patent No.: US 12,642,198 B2
(45) Date of Patent: Jun. 2, 2026

(54) SPRINKLER

(71) Applicant: Katco Holdings Pty Ltd, Wangi Wangi (AU)

(72) Inventors: Kathleen Holmes, Wangi Wangi (AU); Tony Holmes, Wangi Wangi (AU)

(73) Assignee: Katco Holdings Pty Ltd, Wangi Wangi (AU)

( * ) Notice: Subject to any disclaimer, the term of this patent is extended or adjusted under 35 U.S.C. 154(b) by 316 days.

(21) Appl. No.: 18/252,497

(22) PCT Filed: Nov. 10, 2021

(86) PCT No.: PCT/AU2021/051329
§ 371 (c)(1),
(2) Date: May 10, 2023

(87) PCT Pub. No.: WO2022/099361
PCT Pub. Date: May 19, 2022

(65) Prior Publication Data
US 2023/0403997 A1 Dec. 21, 2023

(30) Foreign Application Priority Data

Nov. 12, 2020 (AU) ................................ 2020904148
Nov. 12, 2020 (AU) ................................ 2020904151

(51) Int. Cl.
*A01G 25/09* (2006.01)
*B05B 3/00* (2006.01)
(Continued)

(52) U.S. Cl.
CPC .............. *A01G 25/09* (2013.01); *B05B 3/008* (2013.01); *B05B 15/16* (2018.02); *B05B 15/625* (2018.02); *B05B 15/658* (2018.02)

(58) Field of Classification Search
CPC ...... A01G 25/09; B05B 15/16; B05B 15/658; B05B 15/625; B05B 3/008
(Continued)

(56) References Cited

U.S. PATENT DOCUMENTS 3,002,697 A * 10/1961 Jones ..................... A01G 25/09
239/587.5
3,045,922 A * 7/1962 Jensen ................... B05B 15/74
239/233
(Continued)

FOREIGN PATENT DOCUMENTS

CA 1304432 C 6/1992
WO 2020173594 A1 9/2020

OTHER PUBLICATIONS

Australian Patent Office; International Search Report and Written Opinion dated Dec. 23, 2021 for Int'l. App. No. PCT/AU2021/051329; 10 pages.

*Primary Examiner* — Chee-Chong Lee
(74) *Attorney, Agent, or Firm* — Chernoff, Vilhauer, McClung & Stenzel LLP

(57) ABSTRACT

A sprinkler comprises a sprinkler head (102) and a sprinkler base (101). The sprinkler base comprises a hollow body having an inlet (104) and a first outlet (105). The first outlet (105) is in fluid communication with the inlet (104). The inlet (104) has an inlet axial orientation which is substantially perpendicular to a first outlet axial orientation of the first outlet (105), which is perpendicular to the inlet axial orientation. The sprinkler base (101) further comprises two or more sprinkler head protection elements (115) located on opposite sides of the first outlet and extending beyond the first outlet in the direction of the first outlet axial orientation.

18 Claims, 5 Drawing Sheets

(51) Int. Cl.
  *B05B 15/16*    (2018.01)
  *B05B 15/625*    (2018.01)
  *B05B 15/658*    (2018.01)

(58) Field of Classification Search
  USPC ........................................................ 239/723
  See application file for complete search history.

(56)        References Cited

U.S. PATENT DOCUMENTS

| | | | |
|---|---|---|---|
| 3,807,638 | A * | 4/1974 | Clements ............... A01G 25/09 |
| | | | 285/190 |
| 4,204,643 | A | 5/1980 | Cornelius |
| 4,700,897 | A | 10/1987 | Smith et al. |
| 7,740,195 | B1 | 6/2010 | Daniels |
| 9,908,136 | B2 | 3/2018 | Holmes |
| 2011/0139898 | A1 | 6/2011 | Shih |

* cited by examiner

SECTION A-A

SECTION B-B

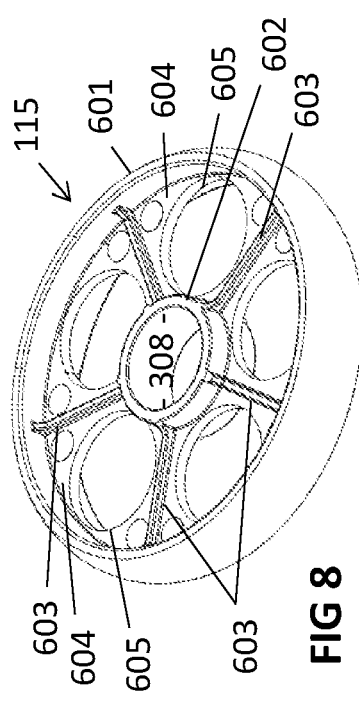
FIG 9
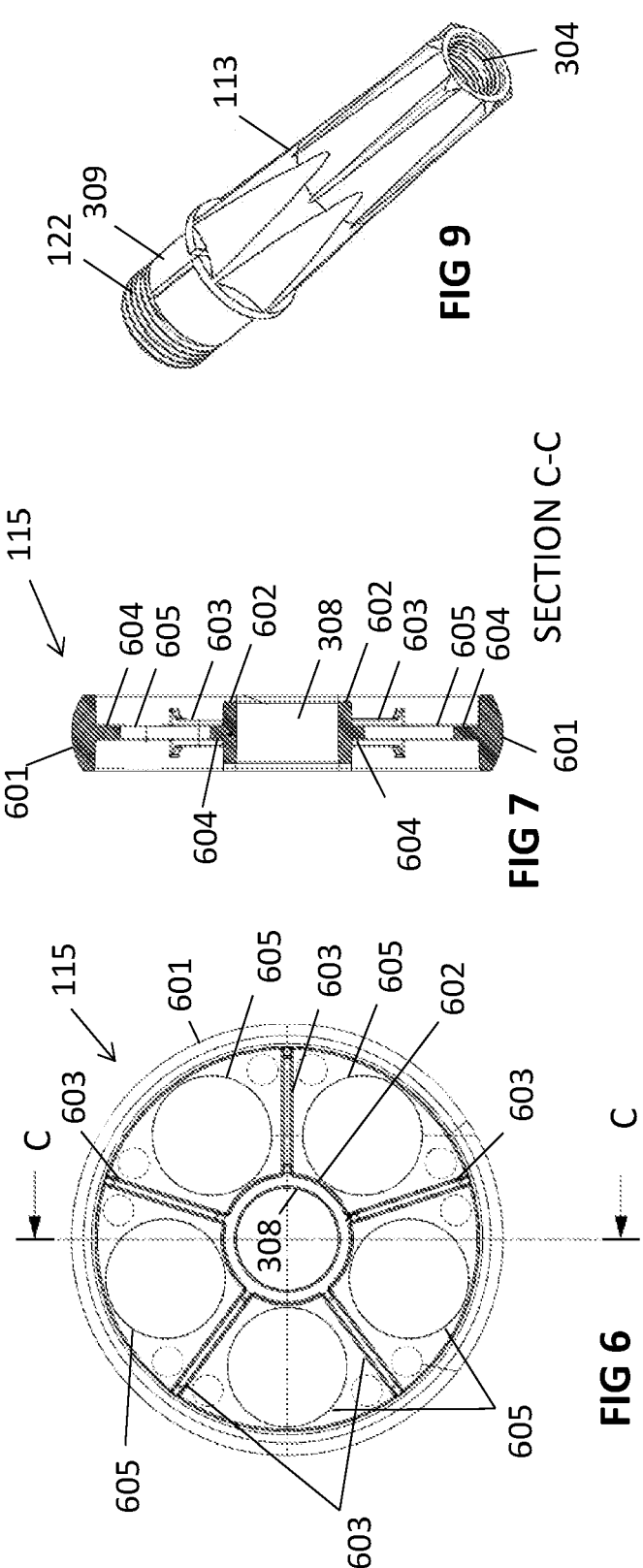
SECTION C-C
FIG 7
FIG 6
FIG 8

SPRINKLER

CROSS-REFERENCE TO RELATED APPLICATIONS

This is a national stage application filed under 35 U.S.C. § 371 based on International Application No. PCT/AU2021/051329, filed on 10 Nov. 2021, and claims priority under 35 U.S.C. § 119 to Australian Provisional Patent Application No. 2020904148 and Australian Provisional Patent Application No. 2020904151 both filed on 12 Nov. 2020, the contents of which are incorporated herein by reference in their entirety.

TECHNICAL FIELD

The invention is generally within the field of sprinklers or sprayers of the type used to apply water to a surface such as a garden or lawn or other watering application.

BACKGROUND OF THE INVENTION

Water sprinklers and sprayers are used for irrigation in domestic gardens and in agriculture to water plants when required to aid cultivation, particularly in environments in which rainfall is inadequate, irregular or unreliable. They may also find applications in dust suppression, effluent dispersal, grey water recycling, roof cooling and bushfire ember protection. Water sprinklers and sprayers come in a variety of designs and sizes to suit uses as varied as a large agricultural acreage or a small domestic garden. In the case of large agricultural sprinkler systems it is usual for multiple spray heads to be distributed over a long supply pipe and it is also common for the spray assembly to be self-propelled to travel across a field without intervention by the farmer. Such systems generally travel on large wheels which are suited for travelling over plowed surfaces. The size and complexity of these sprinklers make them expensive, and even in a scaled down version, are not appropriate for domestic use.

In the case of domestic sprinklers and sprayers, generally only one spray head is provided per sprinkler base and although they will distribute water over a certain area, that area is generally less than the area to be watered, making it is-necessary to reposition the sprinkler or sprayer periodically to water the entire area to be watered. In the case of garden sprinklers and sprayers, the sprinkler or sprayer is often attached to the end of a flexible hose and in some instances users choose to reposition the sprinkler or sprayer by dragging the hose and attached sprinkler or sprayer to a new location, particularly when watering a large area of lawn.

Small garden sprinklers and sprayers often comprise a sprinkler or spray head mounted on a base which supports the head and provides a water flow connection between the hose and the sprinkler or sprayer head. Such bases take many forms and often do not lend themselves to being dragged during repositioning. For example, if the base has legs, these will catch in turf or uneven surfaces making the base difficult to pull along, and possibly causing it to trip over. Other bases have a sled style configuration which can make dragging easier but can still be prone catching or tripping. Still other bases may be provided with wheels, but if the wheels are too small they might still not make dragging easy and can still allow tripping. As well as being difficult to drag, some bases may also allow the attached sprinkler or sprayer heads to be damaged if the base trips over and is dragged while inverted.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

BRIEF SUMMARY OF THE INVENTION

The invention provides a sprinkler which comprises a sprinkler head and a hollow body having an inlet and a first outlet, the first outlet being in fluid communication with the inlet and the sprinkler head being connected to the first outlet, the inlet having an inlet axial orientation which is substantially perpendicular to a first outlet axial orientation of the first outlet, the sprinkler further comprising two or more sprinkler head protection elements located on opposite sides of the sprinkler head and extending beyond the sprinkler head in the direction of the first outlet axial orientation.

The invention also provides a sprinkler base comprising a hollow body having an inlet and a first outlet, the first outlet being in fluid communication with the inlet, the inlet having an inlet axial orientation which is substantially perpendicular to a first outlet axial orientation of the first outlet, which is substantially perpendicular to the inlet axial orientation, the sprinkler base further comprising two or more sprinkler head protection elements located on opposite sides of the first outlet and extending beyond the first outlet in the direction of the first outlet axial orientation.

In the sprinkler and sprinkler base, the sprinkler head protection elements may project beyond the first outlet by a sprinkler head protection distance which is greater than a projected length of a sprinkler head when the sprinkler head is fitted to the sprinkler base. Preferably, the sprinkler head protection distance may be greater than 60 mm, preferably greater than 70 mm and more preferably greater than 80 mm. Preferably also, the sprinkler head protection distance is not greater than 100 mm. In a preferred embodiment the sprinkler head protection elements may be wheels each located on opposite sides of the hollow body and each having axes in a common plane perpendicular to the inlet axial orientation. In this case, the rims/peripheries of the wheels determine the sprinkler head protection distance. However, the sprinkler base may include skids rather than wheels, in which case the sprinkler head protection elements may also comprise fixed projections such as inverted skids.

Wheels on the sprinkler or sprinkler base may be angled relative to one another such that the wheels are closer together on a first side of the periphery of the wheels adjacent to the first outlet, and the sprinkler head when fitted, and further apart on an opposite side of the periphery of the wheels relative to the first side of the periphery of the wheels.

The hollow body may comprise a manifold having a second outlet as well as the first outlet, the second outlet including a threaded end for hose attachment. The second outlet is preferably at an opposite end of the manifold from the inlet and may be axially aligned with the inlet.

The wheels may be rotatably mounted at distal ends of arms extending from the manifold. The arms may also be removable from the manifold and the wheels may be removable from the arms for shipping. The manifold may include third and fourth outlets adjacent to the first outlet, in which case the arms may be hollow and attached to the third and fourth outlets of the manifold. Each arm may also have a threaded distal end for hose attachment. The threaded distal end of each arm will preferably extend beyond a respective wheel-bearing surface of the arm and the respective wheel attached to the arm may be retained by a threaded fitting screwed onto the respective threaded distal end.

Longitudinal axes of the arms may subtend an angle with one another of less than 180°. Preferably, the longitudinal axes of the arms subtend an angle with one another of in the range of 140°-170°.

Preferably, only one sprinkler or spray head outlet is provided between the sprinkler head protection elements and accordingly only one sprinkler or spray head is provided on the hollow body. The sprinkler body preferably does not include a means of propulsion.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF THE DRAWINGS

An embodiment of a sprinkler is described below with reference to the accompanying drawings in which:

FIG. 6 is a side view of a wheel of the base part of FIGS. 1 & 2;

FIG. 7 is a sectional view C-C of the wheel of FIG. 6;

FIG. 8 is a perspective view of the wheel of FIGS. 6 & 7; and

FIG. 9 is a perspective view of an arm of the base part of FIGS. 1-3.

DETAILED DESCRIPTION OF PREFERRED EMBODIMENTS

Figure 1:
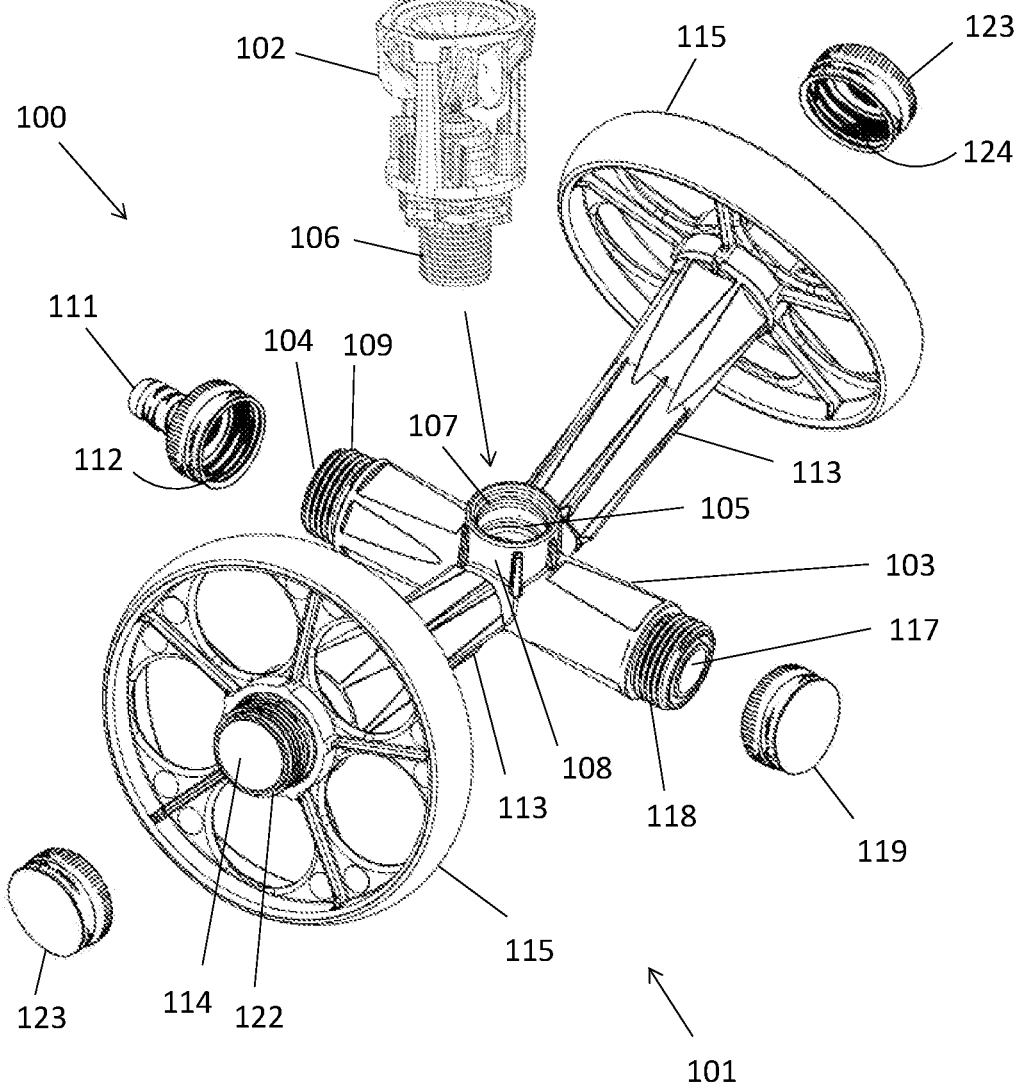
FIG. 1 is a partially exploded perspective view of a sprinkler assembly, viewed from above.
Figure 2:
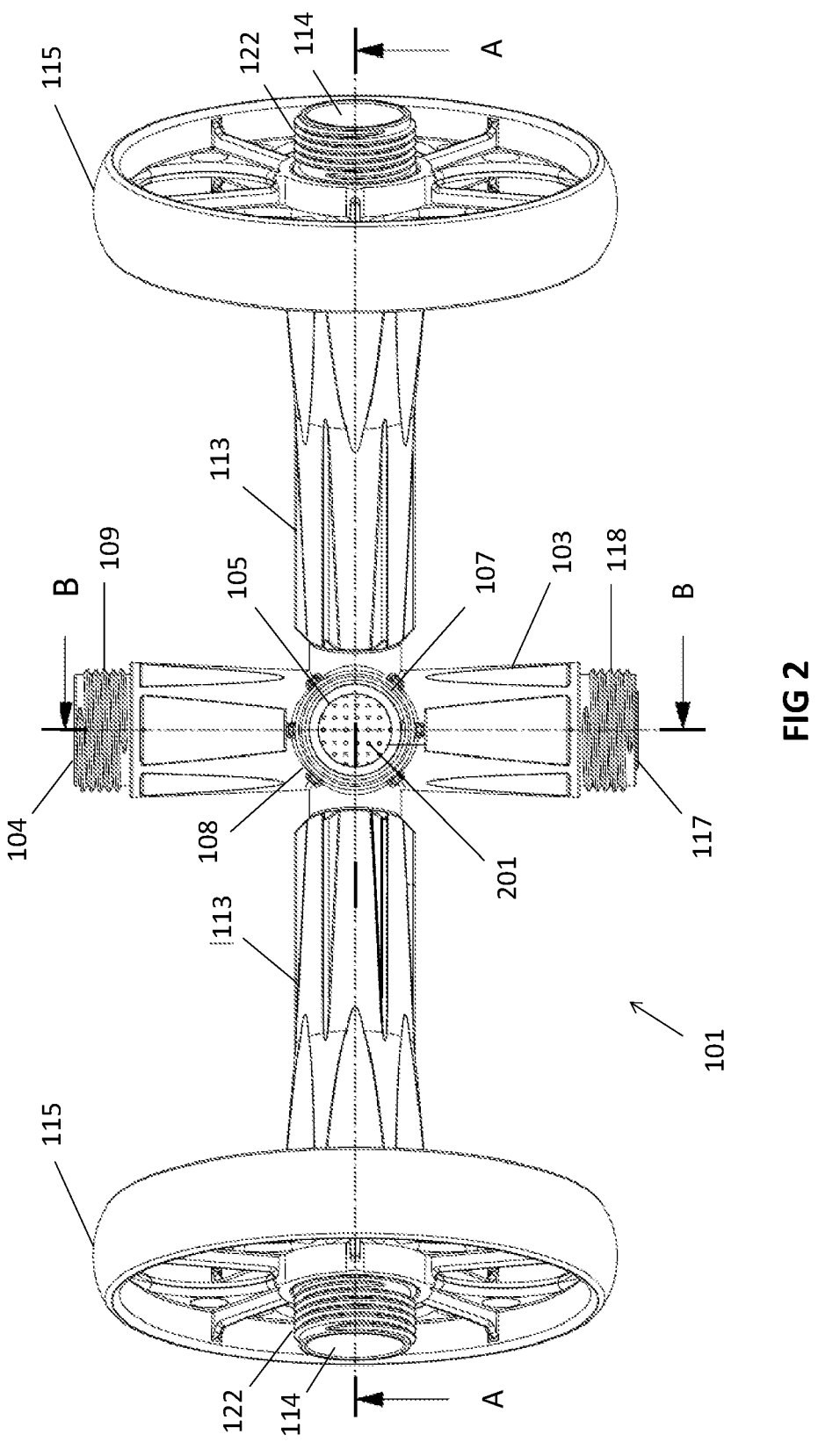
FIG. 2 is a plan view of the base part of the sprinkler of FIG. 1.
Figure 3:
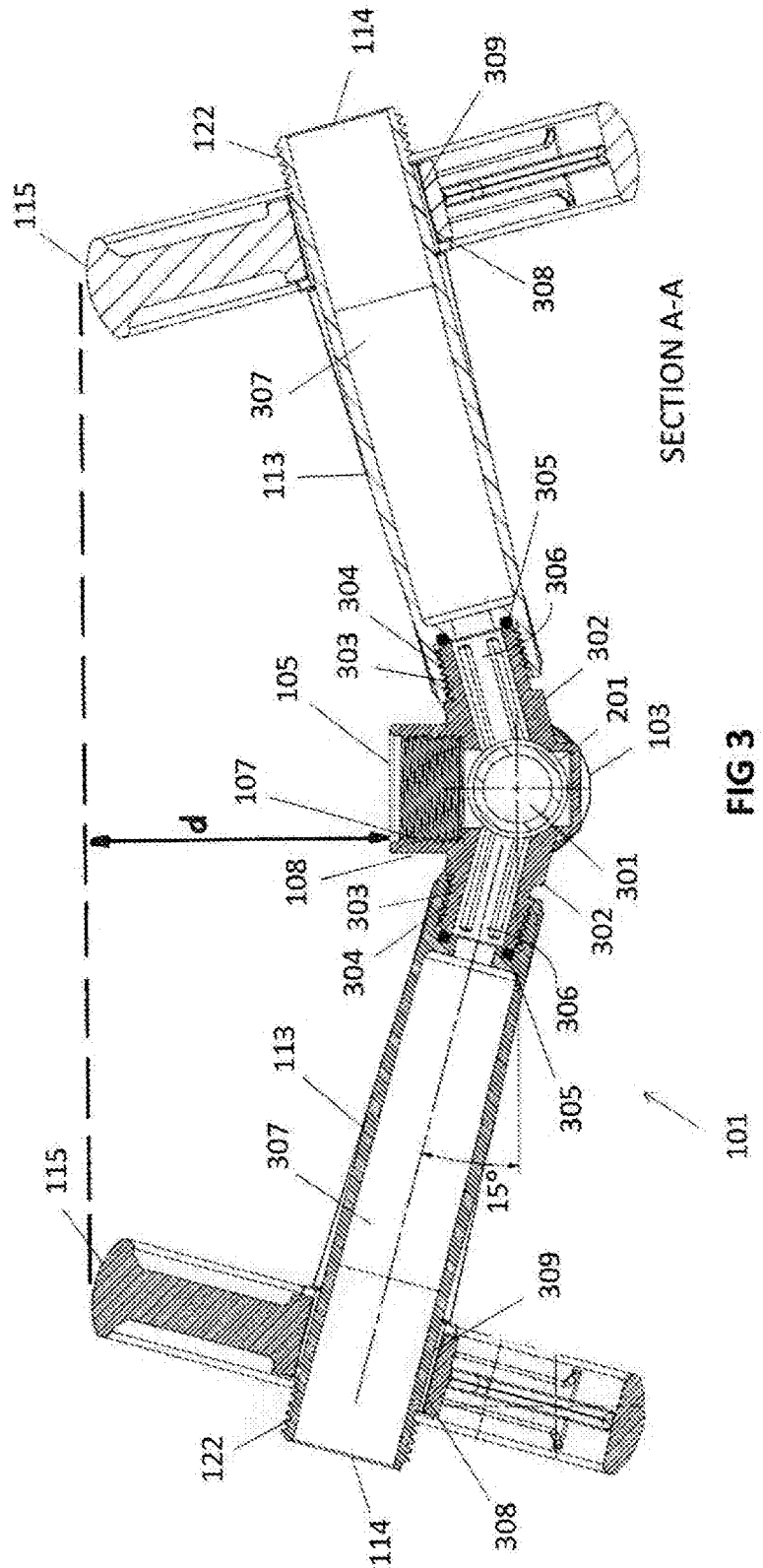
FIG. 3 is transverse sectional view A-A of the base part of FIG. 2.

Referring to the accompanying drawings, a particularly preferred embodiment of a sprinkler 100 is illustrated in FIG. 1, while FIGS. 2 and 3 show alternate views of the sprinkler base 101. The sprinkler 100 is illustrated in perspective view in FIG. 1 and comprises the base 101 and a sprinkler head 102 (shown detached). The base 101 (also seen in plan view in FIG. 2) has a hollow body or manifold 103 provided with an inlet 104 and at least a first outlet 105 in fluid communication. Throughout this description, the sprinkler 100 will described in the orientation shown in FIG. 1 in which the first outlet 105 is on the upper side of the manifold 103. The sprinkler head 102 has a male threaded inlet 106 which can be screwed into the female threaded portion 107 of the first outlet 105 formed in a turret 108 to allow attachment of the sprinkler head to the manifold 103. The first inlet 104 is also threaded with a male thread 109 to allow attachment of a hose, either directly via a threaded end fitting, or via a snap-on type connection. A male portion 111 of a snap-on connector pair is illustrated, having a female threaded nut 112 for attachment to the male thread 109 of the first inlet 104.

The sprinkler head 102 may be of any appropriately sized type of sprinkler or spray head, such as a restricted orifice type spray head, a rotary sprinkler head or a wobbling type sprinkler head. By way of example in FIG. 1, the illustrated sprinkler head is a wobbling type sprinkler head.

Extending from two sides of the manifold 103 are two arms 113, distal ends of which provide mounting points for sprinkler head protection elements in the form of wheels 115. Preferably, the two arms 113 extend substantially perpendicularly to a centre line of the manifold 103, for simplicity of manufacture, although the perpendicularity of the arms is not essential and, in fact, they need not be straight, provided the wheel mounting points allow the axis of each wheel to extend in a single plane substantially perpendicular to the central axis of the manifold 103. As illustrated, the two arms 113 of the preferred embodiment are angled relative to one another such that the wheels 115 are not parallel. The upper peripheries of the wheels 115 are closer together than the lower peripheries. This angling of the arms 113 and wheels 115 causes the manifold 103 to be below the centre of the wheels in use and thus lowers the centre of gravity of the base 103. in the illustrated embodiment, the angle of each arm is 15° above horizontal such that the wheels 115 converge upwards at an angle of 30°. It will be recognised that differing angles might be employed depending on the choice of the size and spacing of the wheels 115 and the height of the sprinkler head 102 and for example, the wheels could be configured to converge at angles within the range of 20°-40°.

The two arms 113 are preferably hollow, although this is not essential and they could be solid. The interior of the preferably hollow arms 113 may also be in fluid communication with the manifold 103 (see description go FIG. 3 below), to advantageously extend the reservoir formed by the manifold 103. The two arms 113 may also have an opening 114 at their distal ends.

The manifold 103 may have a second outlet 117 threaded with a male thread 118 to allow attachment of an extension hose, either directly via a threaded end fitting, or via a snap-on connection such as the snap-on fitting 111. When not in use the second out-let 117 is capped with and end cap 119 having a female thread matching the male thread 118.

The two arms are terminated by threaded portions 122 to which threaded end caps 123, similar to the end cap 119, are attached via a female thread 124 which mates with the male thread 122. The end caps 123 serve a dual purpose of retaining the wheels 115 and closing the openings 114. However the end caps 123 may be replaced by a hose connection (such as one similar to the snap-on fitting 111), which allows additional hose extensions to be connected if required, for example to connect additional sprinklers in a sprinkler array.

A filter may be provided within the manifold 103, such as the filter 201 which is partially visible through the opening of the outlet 105 in FIG. 2.

The sectional view A-A of the Base 101 seen in FIG. 3 provides a view of the internal chamber 301 of the manifold 103 and an end view of the cylindrical filter 201 contained therein.

Each of the arms 113 are attached to respective projections 302 extending from either side of the manifold 103, with a male threaded section 303 of each projection 302 receiving a female threaded opening 304 in the proximal end of the respective arm 113. Seals 305 are provided to prevent leakage between the threads 303, 305.

Passages 306 in each of the projections 302 provide fluid communication between the chamber 301 of the manifold and further chambers 307 in each arm 113 to form a reservoir which fills with water when the sprinkler is in use. The water in this reservoir provides a ballast which dampens vibration which would otherwise occur due to movement of the head 102 and reactionary forces due to the projection of water out of the head 102.

The wheels 115 are mounted on the arms 113 with bearing surfaces 308 of the wheels 115 closely fitting over respective bearing surfaces 309 of the arms 113. The threads 122 project past the wheels by a distance which is slightly greater than the interior threads 124 of the end caps 123 (see FIG. 1), such that a small clearance is provided between the wheels 115 and the end caps 123 when the end caps are screwed tightly onto the threads 122.

The sprinkler head protection elements/wheel rims (601—refer to FIG. 6) project/extend beyond the first outlet 105 by a sprinkler head protection distance d (in the direction of the axis of the first outlet 105). The distance d is greater than a projected length of a sprinkler head when the sprinkler head is fitted to the sprinkler base (refer to FIG. 3). In other words when a typical sprinkler head is attached to the outlet 105, it does not extend beyond the distance d, being a notional line or plane extending between the wheel rims. Most preferably, the sprinkler head protection distance is from 80 mm to 100 mm, although from 60 mm to 80 mm is also possible, but less preferred.

Figure 4:
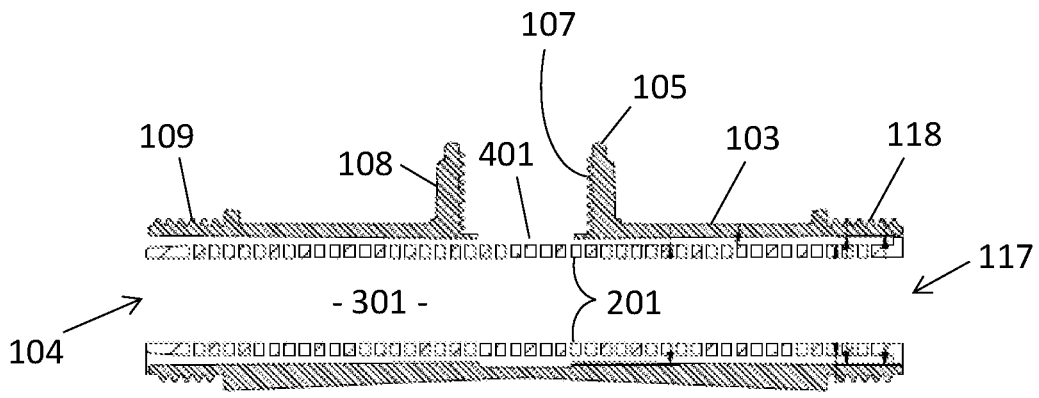
FIG. 4 is a longitudinal sectional view B-B of the base part of FIG. 2.

Section B-B of the manifold 103 seen in FIG. 4 shows the location of the elongate cylindrical filter 201 within the chamber 301 of the manifold 103. The filter comprises a perforated cylinder, preferably of moulded plastic material and extends across the opening 401 in the chamber 301 at the base of the turret 108, such that particulate material in the water supply will be blocked from exiting the outlet 105. The filter 201 similarly extends across the entrances to passages 302 in the projections 301 to block particulate material from entering the chambers 307 of the arms 113. Orifices of the sprinkler head through which water is emitted are preferably sized to be larger than perforations in the filter 201, in order to prevent jet blockages of the orifices in the sprinkler. However, water passing to the first outlet 117 is unfiltered and must be filtered downstream if required.

Figure 5:
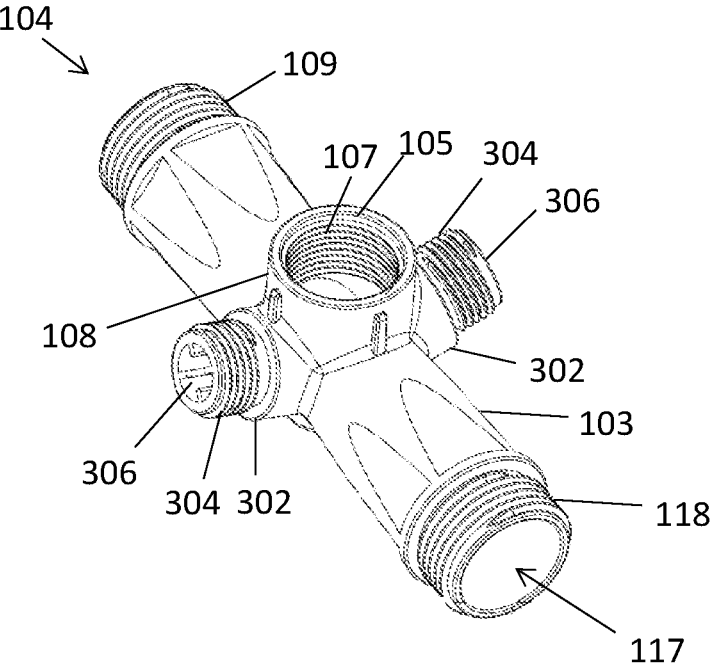
FIG. 5 as a perspective view of a manifold part of the base of FIG. 1-4.

FIG. 5 is a perspective view of the manifold 103 providing another viewpoint for the elements discussed above.

FIGS. 6, 7 and 8 show the wheel 115 respectively in side view, sectional view (section C-C) and perspective view. The wheel 115 comprises a rim 601, a hub 602 and spokes 603 connecting the rim 601 to the hub 602. The bearing surface 309 of the wheel 115 is formed by the inner surface of the hub 603. Five spokes are shown but 3, 4 or 6 or more spokes might also be employed. Webs 604 extend between the spokes 603 and holes 605 are provided in each web. The holes 605 are sized to receive the end caps 119 & 123 and the snap-on fitting 111 with an interference fit for transport or storage.

FIG. 9 is a perspective view of an arm 113, providing another viewpoint for the elements discussed above.

As discussed above, users of domestic sprinklers may often move a sprinkler by pulling the attached hose to tow the sprinkler along. However in some cases the sprinkler can flip over, subjecting the sprinkler head to shear forces which may result in break-age. In the present embodiment, by using relatively large diameter wheels 115 the sprinkler head 102 can be contained within the envelope of the base 101 and this protects the sprinkler head in the case of a flip over. Angling of the arms 113 on which the wheels 115 are mounted causes the manifold 103 to be lowered relative to the centre of the wheels 115 and results in the lowering of the centre of gravity of the sprinkler 100 thereby reducing the tendency to flip. In use, filling of the cavities 301, 307 of the base 101 with water also enhances the stability of the sprinkler 100.

The large diameter wheels 115 and the angling of the arms 113 place a majority of the weight of the sprinkler head 102 and base 101 below the centre of the wheels 115, which gives the product a low centre of gravity and high stability. When connected to a hose the weight and stability is further increased because of the added weight of water held in the cavities 301, 307. The offset angle of the wheels provides a wide footprint when the sprinkler 100 is in use for watering, and when being relocated by dragging.

The offset large diameter wheels 115 protect the sprinkler head 102 from coming in contact with the ground in the event of the sprinkler 100 unintentionally overturning while being pulled along. Further if the sprinkler 100 does become inverted inadvertently, the footprint of the wheels 115 on the ground when in the inverted orientation becomes narrower due to the angle of the wheels 115 and this combined with the weight of the contained water, which is now predominantly above the axis of the wheels 115, creates an increased likelihood of the sprinkler 100 self-righting itself to the normal operating orientation.

The relatively large diameter of the wheels 115 provides easier rolling over turf and uneven surfaces and, when placed on a hard level surface, allows the wheels 115 to support the hose connector fitting 111 and manifold 103 above the ground, to minimise wear of the hose connector fitting 111 and manifold 103 when being dragged across the ground. When in operation watering a lawn, the wheels 115 may settle into the surface of the lawn, due to the weight of the contained water, and the manifold 103 and hose connection fitting 111 may sit relatively flush to the ground, further improving stability.

The hose connection fitting 111 on the sprinkler attaches to the manifold 103 horizon-tally, and the sprinkler head 102 is screwed into the turret 105 of the manifold 103 vertically. The three additional outlets 117, 114 provided on the manifold 103 and the arms 113 are shown in FIG. 1 with screwed end cap fittings 119, 123 fitted for the case where a single sprinkler 100 is used. By removing one or more of the end caps 119, 123 additional hose connection fittings can be attached to the outlets 114, 117 which are uncapped. Hoses and sprinklers attached to one or more of these additional connection outlets 114, 117 may be configured to form a grid pattern of sprinkler placements allowing simultaneous watering of a larger area.

As mentioned above, the inclusion of two relatively large wheels on the sprinkler base allows it to be easily towed by pulling on the attached hose to relocate the sprinkler 100 without touching the sprinkler head 102 or base 101. Thus, by pulling the hose, the sprinkler 100 can be relocated, along with any attached additional sprinklers. An advantage of being able to tow the sprinkler 100 without touching the sprinkler head 102 or base 101 is that if the sprinkler 100 is used with recycled water, grey water, and black water, there is a reduced chance of the user coming into contact with the fluid.

Versatility of the sprinkler is enhanced by addition of an internal filter 201 that pre-vents larger particulate matter in the water from blocking fine orifices in the sprinkler head 102. The filter is easily accessible for cleaning by removing the inlet hose connector fitting 111. The sprinkler 100 may additionally be employed for roof cooling and ember protection, and to this end, the spacings between the wheels 115 and the manifold 103 are designed to fit neatly into standard roofing valley contours of corrugated iron sheets.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A sprinkler comprises a sprinkler head and a hollow body having an inlet and a first outlet, the first outlet being in fluid communication with the inlet and the sprinkler head being connected to the first outlet, the inlet having an inlet axial orientation which is perpendicular to a first outlet axial orientation of the first outlet and the sprinkler head extending above the first outlet in a first axial direction of the first outlet axial orientation, the sprinkler further comprising two or more sprinkler head protection elements located on opposite sides of the sprinkler head and extending above the sprinkler head in the first axial direction;

wherein the sprinkler head protection elements are wheels each located on opposite sides of the hollow body and each having axes in a common plane perpendicular to the inlet axial orientation; and wherein the wheels are angled relative to one another with respect to the first axial direction such that the wheels are closer together on an upper side of the periphery of the wheels which extend above the sprinkler head in the first axial direction and further apart on an opposite lower side of the periphery of the wheels relative to the upper side of the periphery of the wheels.

2. A sprinkler base comprising a hollow body having an inlet and a first outlet, the first outlet being in fluid communication with the inlet, the inlet having an inlet axial orientation which is perpendicular to a first outlet axial orientation of the first outlet and the first outlet is adapted to receive a sprinkler head extending in a first axial direction of the first outlet axial orientation, the sprinkler base further comprising two or more sprinkler head protection elements located on opposite sides of the first outlet and extending above the first outlet in the first axial direction;

wherein the sprinkler head protection elements are wheels each located on opposite sides of the hollow body and each having axes in a common plane perpendicular to the inlet axial orientation; and wherein the wheels are angled relative to one another with respect to the first axial direction such that the wheels are closer together on an upper side of the periphery of the wheels which extend above the first outlet and further apart on an opposite lower side of the periphery of the wheels relative to the upper side of the periphery of the wheels.

3. The sprinkler base of claim 2 wherein the sprinkler head protection elements project above the first outlet in the first axial direction by a sprinkler head protection distance which is greater than a projected length of a sprinkler head when the sprinkler head is fitted to the sprinkler base.

4. The sprinkler base of claim 3 wherein the sprinkler head protection distance is greater than 60 mm.

5. The sprinkler base of claim 3 wherein the sprinkler head protection distance is greater than 70 mm.

6. The sprinkler base of claim 3 wherein the sprinkler head protection distance is greater than 80 mm.

7. The sprinkler base of claim 3 wherein the sprinkler head protection distance is less than 100 mm.

8. The sprinkler base of claim 2 wherein the hollow body is a manifold having a second outlet as well as the first outlet, the second outlet including a threaded end for hose attachment.

9. The sprinkler base of claim 8 wherein the second outlet is at an opposite end of the manifold from the inlet and is axially aligned with the inlet.

10. The sprinkler base of claim 9 wherein the wheels are rotatably mounted at distal ends of arms extending from the manifold.

11. The sprinkler base of claim 10 wherein the arms are removable from the manifold and the wheels are removable from the arms for shipping.

12. The sprinkler base as claimed in claim 11 wherein the manifold has third and fourth outlets adjacent to the first outlet, each outlet having an axis extending perpendicular to the inlet axial orientation, the arms are hollow and are attached to the third and fourth outlets of the manifold and each arm being provided with a threaded distal end for hose attachment.

13. The sprinkler base as claimed in claim 12 wherein the threaded distal end of each arm extends beyond a respective wheel-bearing surface and the respective wheel attached to the arm is retained by a threaded fitting screwed onto the respective threaded distal end.

14. The sprinkler base as claimed in claim 10 wherein longitudinal axes of the arms subtend an angle with one another of less than 180°.

15. The sprinkler base as claimed in claim 14 wherein longitudinal axes of the arms subtend an angle with one another of in the range of 140°-170°.

16. The sprinkler base as claimed in claim 2 wherein only one sprinkler head outlet is provided between the sprinkler head protection elements.

17. The sprinkler base as claimed in claim 2 wherein the sprinkler base is not self-propelled.

18. A sprinkler base as claimed in claim 2 and further including a sprinkler head mounted on the sprinkler base and connected to the first outlet and wherein the sprinkler head protection elements project beyond the first outlet in the first axial direction by a sprinkler head protection distance which is greater than the length of the sprinkler head.

* * * * *